US009543056B2

(12) United States Patent
Svanberg et al.

(10) Patent No.: US 9,543,056 B2
(45) Date of Patent: Jan. 10, 2017

(54) SEMICONDUCTIVE POLYOLEFIN COMPOSITION COMPRISING CONDUCTIVE FILLER

(75) Inventors: Christer Svanberg, Kallered (SE); Tung Pham, Linz (AT); Muhammad Ali Malik, Stenungsund (SE); Francis Costa, Linz (AT); Yi Liu, Linz (AT); Takashi Uematsu, Stenungsund (SE); Thomas Gkourmpis, Gothenburg (SE)

(73) Assignee: BOREALIS AG, Vienna (AT)

( * ) Notice: Subject to any disclaimer, the term of this patent is extended or adjusted under 35 U.S.C. 154(b) by 805 days.

(21) Appl. No.: 13/639,554

(22) PCT Filed: Apr. 5, 2011

(86) PCT No.: PCT/EP2011/001686
§ 371 (c)(1),
(2), (4) Date: Oct. 26, 2012

(87) PCT Pub. No.: WO2011/124360
PCT Pub. Date: Oct. 13, 2011

(65) Prior Publication Data

US 2013/0037759 A1 Feb. 14, 2013

(30) Foreign Application Priority Data

Apr. 6, 2010 (EP) .................................... 10003716

(51) Int. Cl.
*H01B 1/24* (2006.01)
*H01B 1/04* (2006.01)
*C08K 3/04* (2006.01)

(52) U.S. Cl.
CPC ...................................... *H01B 1/24* (2013.01)

(58) Field of Classification Search
CPC ............. H01B 1/04; H01B 1/24; B82Y 30/00; C08K 3/04
USPC ................ 252/500–519.1; 423/445 B–447.2; 977/773, 783, 785, 932
See application file for complete search history.

(56) References Cited

U.S. PATENT DOCUMENTS

| | | | | |
|---|---|---|---|---|
| 4,971,726 | A | 11/1990 | Maeno et al. | |
| 5,556,697 | A | 9/1996 | Flenniken | |
| 6,086,792 | A * | 7/2000 | Reid | H01B 1/24 174/102 SC |
| 6,514,608 | B1 * | 2/2003 | Foulger | 428/372 |
| 7,071,258 | B1 | 7/2006 | Jang et al. | |
| 2002/0054995 | A1 | 5/2002 | Mazurkiewicz | |
| 2004/0127621 | A1 | 7/2004 | Drzal et al. | |
| 2005/0064177 | A1 | 3/2005 | Lee et al. | |
| 2006/0231792 | A1 * | 10/2006 | Drzal et al. | 252/188.28 |
| 2006/0241237 | A1 | 10/2006 | Drzal et al. | |
| 2007/0134506 | A1 * | 6/2007 | Chasey et al. | 428/492 |
| 2008/0149363 | A1 * | 6/2008 | Han et al. | 174/102 SC |
| 2008/0157028 | A1 * | 7/2008 | Nylander et al. | 252/511 |
| 2009/0294736 | A1 * | 12/2009 | Burton et al. | 252/511 |
| 2010/0025073 | A1 * | 2/2010 | Fagrell et al. | 174/120 SC |
| 2011/0017509 | A1 * | 1/2011 | Galletti | 174/74 R |

FOREIGN PATENT DOCUMENTS

| | | | | |
|---|---|---|---|---|
| WO | 03/002652 A1 | 1/2003 | | |
| WO | 2008/045778 A1 | 4/2008 | | |
| WO | 2008/079585 A1 | 7/2008 | | |
| WO | 2008/143692 A1 | 11/2008 | | |
| WO | WO 2009106507 A2 * | 9/2009 | | C09C 1/46 |
| WO | 2010/016976 A1 | 2/2010 | | |

OTHER PUBLICATIONS

Dissado et al. (Characterizing HV XLPE cables by electrical, chemical and microstructural measurements on cable peeling: effects of surface roughness, thermal treatment and peeling location. Conf on Elec Ins and Diel Phen, 1, pp. 136-140, Oct. 2000).*
Stankovich et al., "Graphene-based Composite Materials", Letters, Jul. 20, 2006, pp. 282-286, vol. 442, Nature Publishing Group.
Schniepp et al., "Functionalized Single Graphene Sheets Derived from Splitting Graphite Oxide", The Journal of Physical Chemistry B Letters, Apr. 4, 2006, pp. 8535-8539, vol. 110, No. 17, American Chemical Society.
Chen et al., "Preparation of Polystryrene/Graphite Nanosheet Composite", Polymer, 2003, pp. 1781-1784, vol. 44, Elsevier Science Ltd.
Hodgkin, "Chmical Analysis", Encyclopedia of Polymer Science and Engineering, 1986, pp. 383-410, vol. 6.
Kalaitzidou et al., "A New Compounding Method for Exfoliated Graphite-Polypropylene Nanocomposites with Enhanced Flexural Properties and Lower Percolation Threshold", Composites Science and Technology, 2007, pp. 2045-2051, vol. 67, Elsevier Ltd.
Klimesch et al., "Polyethylene: High Pressure", Encyclopedia of Materials: Science and Technology, 2001, pp. 7181-7184, Elsevier Science Ltd.
McGraw-Hill Dictionary of Scientific and Technical Terms, 1989, 4th Ed., pp. 1698.

* cited by examiner

*Primary Examiner* — Tri V Nguyen
(74) *Attorney, Agent, or Firm* — Roberts Mlotkowski Safran Cole & Calderon, P.C.

(57) ABSTRACT

The present invention relates to a semiconductive polyolefin composition comprising graphene nanoplatelets. It also relates to a semiconductive polyolefin composition comprising the combination of graphene nanoplatelets and carbon black. Moreover, the present invention is related to a process for producing the semiconductive polyolefin composition as well to the use of the semiconductive polyolefin composition in a power cable. Further, the invention is also related to an article, preferably a power cable comprising at least one semiconductive layer comprising said polyolefin composition.

18 Claims, 7 Drawing Sheets

SEMICONDUCTIVE POLYOLEFIN COMPOSITION COMPRISING CONDUCTIVE FILLER

The present invention relates to a semiconductive polyolefin composition comprising graphene nanoplatelets. It also relates to a semiconductive polyolefin composition comprising the combination of graphene nanoplatelets and carbon black. Moreover, the present invention is related to a process for producing the semiconductive polyolefin composition as well as to the use of the semiconductive polyolefin composition in a power cable. Further, the invention is also related to an article, preferably a power cable comprising at least one semiconductive layer comprising said polyolefin composition.

A semiconductive material is defined as a material having an electrical conductivity intermediate between insulators and conductors. A typical range of electrical conductivity for semiconductors is in the range from $10^{-9}$ to $10^{3}$ S/cm corresponding to electrical resistivity between $10^{9}$ to $10^{-3}$ ohm·cm (see for example McGraw-Hill Dictionary of Scientific and Technical Terms, 4th Ed., pp. 1698, 1989).

A common means to achieve a semiconductive polymer composite is to incorporate carbon black in the polymer with typically 30 to 50 wt % such as for example disclosed in U.S. Pat. No. 5,556,697. However, high loadings of carbon black result in high viscosity of the compounds. Lower carbon black loadings are desirable to improve the processability of the compounds in cable extrusions yet maintaining high conductivity. One option is high structure carbon black such as Ketjen Black. This can reduce the required amount of conductive filler but, due to the high structure the viscosity is drastically increased even at these low loadings.

A further drawback of carbon black fillers is that upon heating volume resistivity (VR) is drastically increased when the polymer composition is heated to standard operating temperature of about 90° C. Additional carbon black may be included to mitigate the temperature dependence of VR but this will result in worsening of the processing properties.

Carbon black may be replaced by expanded graphite to increase the conductivity, as described in WO2008/079585. WO2008/079585 discloses a semiconductive composition comprising a polyolefin polymer and an expanded graphite which is contained in the composition in an amount of 0.1 to 35 wt. % of the total formulation. Processes for preparing the expanded graphite are also disclosed. However, the loading required for expanded graphite to achieve a substantial increase in conductivity is 10 to 15 wt % giving a significant contribution to the viscosity. Even more important is that the large particles of expanded graphite give a very rough surface, which is undesired in cable applications. Hence, there is a need for semiconductive polymeric compositions that combine high conductivity, low viscosity and high surface smoothness.

Other options for increasing the conductivity in semiconductive materials are the incorporation of carbon nanotubes (CNTs) and graphene nanoplatelets (GNPs). US patent application US 2005/0064177 A1 discloses semiconductive compositions with a combination of carbon black (CB) and carbon nanotubes (CNTs). However, the combined loadings of CNT and CB required to achieve a low resistivity is typically in excess of 15 wt %, which results in a reduced ability to flow. It is therefore desirable to have a semiconductive composition with reduced overall filler concentration, enabling smooth surface and good flowability. Moreover, CNTs are presently disfavored due to their extremely high price.

On the other hand, GNPs have recently found applications in electroconductive materials.

Possible production procedures of graphene nanoplatelets and single graphene sheets have been disclosed in e.g. US 2002/054995 A1, US 2004/127621 A1, US 2006/241237 A1 and US 2006/231792 A1. Such processes are for example further discussed by Stankovich et al, Nature 442, (2006) pp. 282, and by Schniepp, Journal of Physical Chemistry B, 110 (2006) pp. 853. Non-limiting examples of materials are Vor-X™ provided by Vorbecks Materials and xGNP™ provided by XG Science.

US2002/054995 A1 discloses how nanoplatelets can be created by high pressure mill giving an aspect ratio between the lateral size and the thickness of 1500:1 and a thickness 1-100 nm.

U.S. Pat. No. 7,071,258 discloses a process for production of nano-scaled graphene plate material comprising a) partially or fully carbonizing a precursor polymer or heat-treating petroleum or coal tar pitch to produce polymeric carbon containing micron- and/or nanometer-scaled graphite crystallites with each crystallites comprising one sheet or a multiplicity of sheets of graphite plane; b) exfoliating the graphite crystallites; and c) mechanical attrition treatment. One dimension is less than 100 nm.

WO2008/045778 A1 discloses a process for functionalisation of graphene sheets. The method is based on adding solvent to obtain graphite oxide with spatially expanded graphene interlayers and subsequently superheating the graphite oxide to decompose the graphite oxide. The obtained surface area is in the range of 300 to 2600 $m^2/g$.

However, from literature reference it can be inferred that an average platelet thickness less than 50 nm cannot be achieved by sonication of expanded graphite materials, see for example Chen et al, Polymer 44 (2003) pp. 1781 and references cited therein.

Electrically conductive polymer nanocomposites have been disclosed using single or multi-layers graphene nanoplatelets as in WO2008/045778A1 and WO2008/143692A1. However, composites with a combination of surface smoothness, low viscosity and low electrical resistivity, have not been disclosed and cable applications are not targeted. This unique combination of properties is central for cable applications, especially semiconductive shields in power cables.

In another aspect, mixtures of GNPs and carbon black as conductive filler are disclosed, e.g. in U.S. Pat. No. 4,971,726 discloses semiconductive composites with carbon black and expanded graphite having an average particle size of 40 μm or more, but it does not consider graphene nanoplatelets with small thickness and large aspects ratio between the thickness and the diameter. Large particle size of the expanded graphite leads to rough surface and hence is not suitable for power cable applications. Moreover, to obtain suitable electrical properties substantial amounts of expanded graphite and carbon black are required which gives an undesired increase in the viscosity of the compound.

The present invention is based on the finding that a semiconductive polyolefin composition comprising an olefin polymer base resin and graphene nanoplatelets can achieve the above objects. Especially such a polyolefin composition provides a unique property profile with combination of low viscosity, smooth surface, low resistivity and low temperature dependence of volume resistivity which is advantageous for cable applications.

In a preferred embodiment of the present invention the above objects are achieved by admixing a solid conductive filler different from graphene nanoplatelets to the polyolefin composition described above.

The present invention is also directed to an article comprising the inventive semiconductive polyolefin composition. Preferably, the article is a power cable, more preferably a power cable comprising a semiconductive layer which comprises the semiconductive polyolefin composition according to the present invention.

Even further, the present invention is also directed to the use of the semiconductive polyolefin composition of the invention in a semiconductive layer of a power cable.

In the following, the figures illustrating the present invention are briefly described. In the figures.

DETAILED DESCRIPTION OF THE INVENTION

Figure 1:
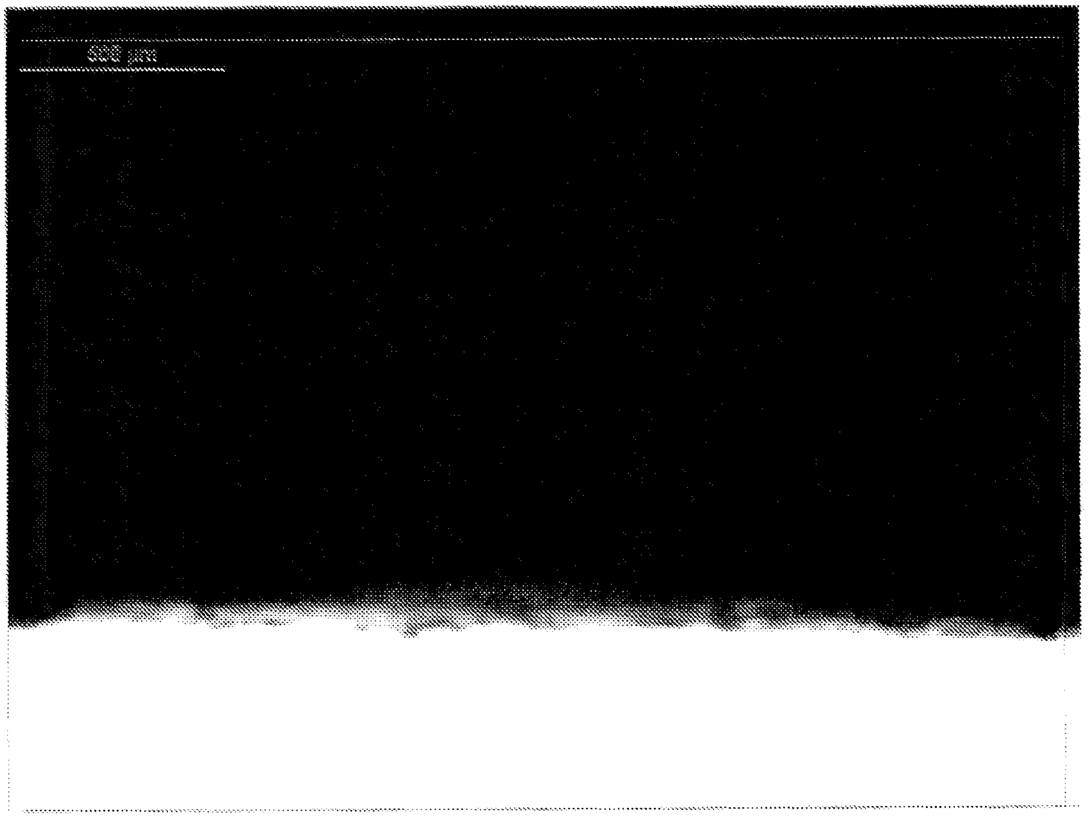
FIG. 1 shows optical microscopy photos of the MFR-strings used to determine the surface smoothness of Example #1.
Figure 2:
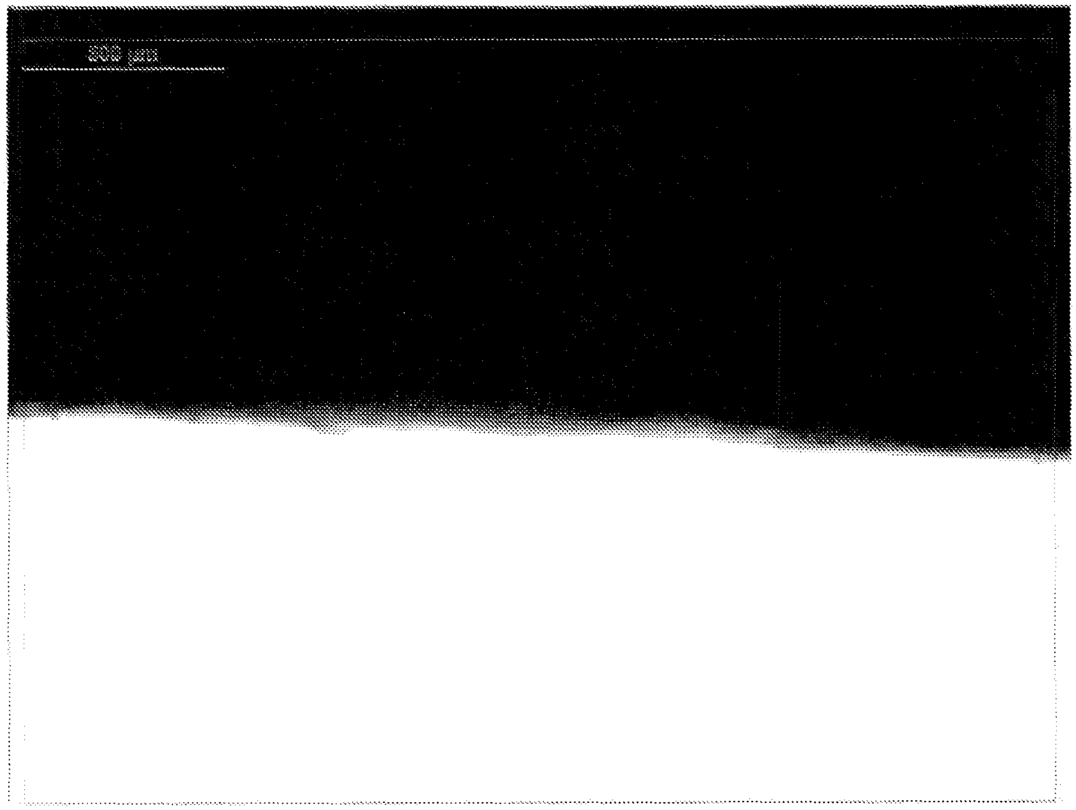
FIG. 2 shows optical microscopy photos of the MFR-strings used to determine the surface smoothness of Example #2.
Figure 3:
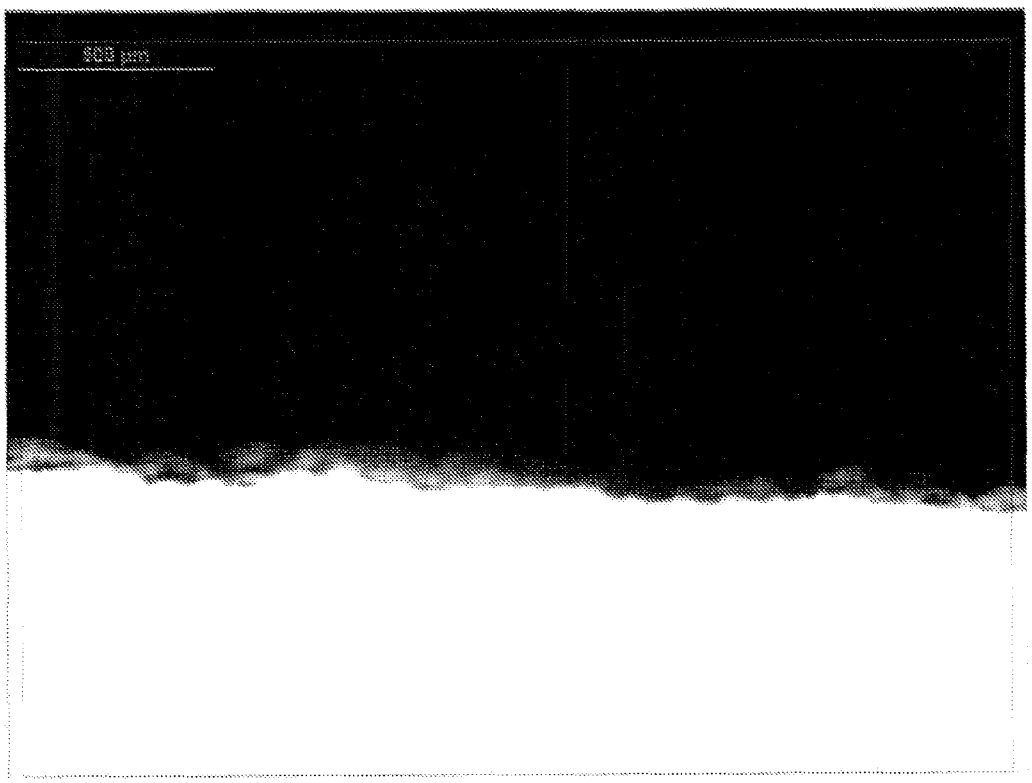
FIG. 3 shows optical microscopy photos of the MFR-strings used to determine the surface smoothness of Comparative Example #1.
Figure 4:
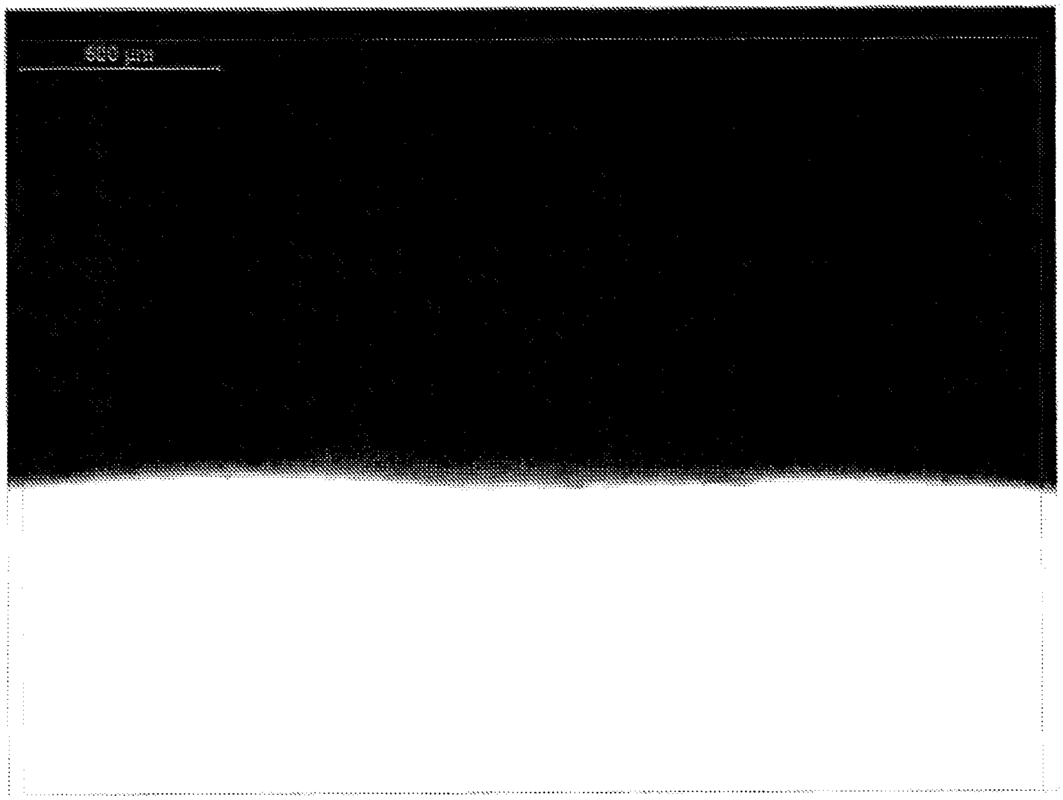
FIG. 4 shows optical microscopy photos of the MFR-strings used to determine the surface smoothness of Comparative Example #2.

The present invention discloses a semiconductive polyolefin composition with low loading filler concentration that has surprisingly low viscosity, high conductivity, excellent surface smoothness and low temperature dependence of volume resistivity. The invention is based on a semiconductive polyolefin composition in which graphene nanoplatelets (GNP) are used in combination with an olefin polymer base resin. In a preferred embodiment optionally a solid conductive filler, different from GNP may be used in the semiconductive polyolefin composition of the present invention.

In the whole disclosure of the present invention the term "expanded graphite" encompasses graphite having no significant order as determined by X-ray diffraction pattern. Expanded graphite has been treated to increase the interplanar distance between the individual layers that form the graphite structure. It is intended that the term "expanded graphite" throughout the present description relates to a graphite material where the distances between the graphene layers have been substantially increased compared to pure graphite. It should be noted in the context of the present invention that general "expanded graphite" structures do not necessarily form graphene nanoplatelets (GNP's) as defined by this invention.

Graphene nanoplatelets (GNPs) are characterised in that the material is composed of one or several layers of two-dimensional hexagonal lattice of carbon atoms. The platelets have a length parallel to the graphite plane, hereafter labeled diameter, and a thickness orthogonal to the graphite plane, hereafter labeled thickness. Another characteristic feature of GNPs is that the platelets are very thin yet have large diameter, hence GNPs have a very large aspect ratio. The typical thickness of graphene nanoplatelets is 100 nm or less, preferably 40 nm or less, more preferably 20 nm or less or 10 nm or less. The included lower limit of graphene nanoplatelets are single graphene sheets. The thickness of a single graphene sheets is around 1 nm, as for example measured with atomic force microscopy (AFM) described in detail e.g. by Stankovich et al, Nature 442, (2006), pp. 282. The lateral diameter on the other hand, which can also be measured with AFM, is typically 200 micrometers or less, preferably 50 micrometers or less or even more preferably 10 micrometers or less. The lateral extension can be controlled by for example milling to the desired size.

It is preferable that the aspect ratio between the diameter and the thickness is 50 or more, more preferable above 500 and most preferable above 1000.

The BET-value of graphene nanoplatelets are typically above 80 $m^2/g$, and can even be up to 2500 $m^2/g$ for materials with a large fraction of single graphene sheets (ASTM D3037).

In another aspect graphene nanoplatelets also include graphene platelets that are somewhat wrinkled such as for example described in Stankovich et al, Nature 442, (2006), pp. 282. Additionally graphene materials with wrinkles to another essentially flat geometry are included. Also more complex secondary structures such as cones are also included, see for example Schniepp, Journal of Physical Chemistry B, 110 (2006) pp. 8535. The definition of GNP does not include carbon nanotubes.

In another aspect the GNPs can be functionalised to improve interaction with the base resins. Non-limiting examples of surface modifications includes treatment with nitric acid treatment; $O_2$ plasma; UV/Ozone; amine; acrylamine such as disclosed in US2004/127621A1.

A specifically preferred embodiment of the graphene nanoplatelets used in the present invention is the commercial product xGNP from XG Science.

In one aspect, the present invention relates to a semiconductive polyolefin composition comprising an olefin polymer base resin, optionally being a polymeric blend comprising one or more olefin polymers, and graphene nanoplatelets, wherein the graphene nanoplatelets are contained in the total composition with a weight percentage of including, but not limited to 2 wt % to 20 wt %, preferably of from 2 to 15 wt %. Further preferred weight ranges may be from 4 to 15 wt %, more preferably 4 to 14 wt %, and most preferably 6 to 12 wt %. The lower limit is due to electrical requirements and the upper limit is due to limitation in the viscosity and surface roughness of the composition.

In another aspect, the graphene nanoplatelets have an average platelet thickness of 50 nm or less, preferably of 40 nm or less, preferably 20 nm or less.

In yet another aspect the present invention relates to graphene nanoplatelets having an aspect ratio of the length divided by the thickness of 50 or more which may be measured by atomic force microscopy (AFM).

The semiconductive polyolefin composition as defined in claim 1 surprisingly provides a combination of advantages. It improves not only processability due to comparatively low viscosity (higher $MFR_2$ values) than conventional semiconductive polyolefin compositions containing carbon black as the conductive filler. Unexpectedly, the present GNP as conductive filler provides at lower loadings the same or even improved level of conductivity compared to conventional carbon blacks. Thus a conveniently low volume resistivity is obtained. Furthermore, the incorporation of GNP into the semiconductive polyolefin compositions gives excellent surface smoothness as expressed by surface roughness calculated as the R_RMS. The method is detailed below. This excellent surface smoothness cannot be achieved by the use of general purpose expanded graphite which usually has rather high particle dimensions, giving increased surface roughness.

Preferably, the semiconductive polyolefin composition according to the present invention has surface roughness characterized by R_RMS, measured on extruded samples, of 100 micrometer or less.

It has further been surprisingly found that the semiconductive polyolefin composition according to the present invention has superior temperature dependence of volume resistivity compared to respective carbon black based semiconductive polyolefin compositions. It was also found that the electrical performance such as VR of the semiconductive polyolefin composition according to the present invention improves upon annealing at temperatures below the melting temperature of the polymer, which is not observed in carbon black based semiconductive polyolefin compositions.

According to a preferred embodiment of the invention, the semiconductive polyolefin composition comprises an olefin polymer base resin which may be a polymeric blend comprising one or more olefin polymers, and a combination of graphene nanoplatelets and a solid conductive filler. In an even more preferred embodiment, the solid conductive filler is carbon black.

Preferably, said carbon black fulfills at least one of the following requirements:

- a iodine number of at least 30 mg/g, measured in accordance with ASTM D 1510,
- a DBP oil adsorption number of at least 30 ml/100 g, measured in accordance with ASTM D 2414,
- a BET nitrogen surface area of at least 30 $m^2/g$, measured in accordance with ASTM D 3037,
- a statistical surface area (STSA) of at least 30 $m^2/g$ measured in accordance with ASTM D5816.

Preferably, said carbon black fulfills any combination of said requirements, more preferably all of said requirements.

The solid conductive filler may be contained in the composition with a fraction of 5 to 95 wt %, preferably 10 to 80 wt %, more preferably 20 to 60 wt % and even more preferably 25 to 50 wt %, in relation to the weight of the graphene nanoplatelets.

It is intended throughout the present description that the expression "solid conductive filler" embraces any type of filler which is electrically conductive and can be dispersed in a polymer. Non limiting examples are electrically conductive carbon black and intrinsically conductive polymers. Any carbon black which is electrically conductive can be used. Preferably the carbon black has one or more of the following properties: i) iodine number of at least 30 mg/g according to ASTM D1510, ii) oil absorption number of at least 30 ml/100 g which is measured according to ASTM D2414, iii) nitrogen surface area (BET measurements) of at least 30 $m^2/g$ according to ASTM D3037, and iv) statistical surface area (STSA) of at least 30 $m^2/g$ according to ASTM D5816. Non-limiting examples of preferable carbon blacks include furnace carbon blacks and acetylene blacks. Non-limiting examples of intrinsic conductive polymers includes poly(p-phenylenevinylene), polyfluorene, polyaniline and polythiophene.

It was unexpectedly found out that with the combination of GNPs and carbon black in the olefin polymer base resin all the above described advantages are retained with the unexpected further reduction of resistivity and viscosity, while a further improvement of surface smoothness and lower temperature dependence of resistivity is achieved. Additionally, a "self-healing" effect was observed, i.e. during operation of the cable the electrical performance will improve with time upon annealing.

Throughout this invention the term "polyolefin" or "olefin polymer" encompasses both an olefin homopolymer and a copolymer of an olefin with one or more comonomer(s). As well known "comonomer" refers to copolymerisable comonomer units.

The polyolefin can be any polyolefin suitable for a semiconductive layer. Preferably, the polyolefin is an olefin homopolymer or copolymer which contains one or more comonomer(s), more preferable an ethylene homo- or copolymer or a propylene homo- or copolymer, and most preferably a polyethylene, which can be made in a low pressure process or a high pressure process. The polyolefin can be e.g. a commercially available polymer or can be prepared according to or analogously to known polymerization process described in the chemical literature.

When the polyolefin, preferably polyethylene, is produced in a low pressure process, then it is typically produced by a coordination catalyst, preferably selected from a Ziegler Natta catalyst, a single site catalyst, which comprises a metallocene and/or non-metallocene catalyst, and/or a Cr catalyst, or any mixture thereof. The polyethylene produced in a low pressure process can have any density, e.g be a very low density linear polyethylene (VLDPE), a linear low density polyethylene (LLDPE) copolymer of ethylene with one or more comonomer(s), medium density polyethylene (MDPE) or high density polyethylene (HOPE). The polyolefin can be unimodal or multimodal with respect to one or more of molecular weight distribution, comonomer distribution or density distribution. As one embodiment low pressure polyethylene may be multimodal with respect to molecular weight distribution. Such a multimodal polyolefin may have at least two polymer components which have different weight average molecular weight, preferably a lower weight average molecular weight (LMW) and a higher weight average molecular weight (HMW). A unimodal polyolefin, preferably low pressure polyethylene is typically prepared using a single stage polymerisation, e.g. solution, slurry or gas phase polymerisation, in a manner well known in the art. A multimodal (e.g. bimodal) polyolefin, for example a low pressure polyethylene can be produced by mechanically blending two or more, separately prepared polymer components or by in-situ blending in a multistage polymerisation process during the preparation process of the polymer components. Both mechanical and in-situ blending is well known in the field. A multistage polymerization process may be preferably carried out in a series of reactors, such as a loop reactor which may be a slurry reactor and/or one or more gas phase reactor(s). Preferably a loop reactor and at least one gas phase reactor is used. The polymerization may also preceded by a prepolymerisation step.

When the polyolefin, preferably polyethylene, is produced in a high pressure process, a LDPE homopolymer or an LDPE copolymer of ethylene with one or more comonomers may be produced. In some embodiments the LDPE homopolymer or copolymer may be unsaturated. For the production of ethylene (co)polymers by high pressure radical polymerization, reference can be made to the Encyclopedia of Polymer Science and Engineering, Vol. 6 (1986), pp 383-410 and Encyclopedia of Materials: Science and Technology, 2001 Elsevier Science Ltd.: "Polyethylene: High-pressure, R. Klimesch, D. Littmann and F.-O. Mähling pp. 7181-7184.

In another aspect polyolefin polymers include, but are not limited to, copolymers of ethylene and unsaturated ester with an ester content of at least about 50 wt %, based on the weight of the copolymer. Non-limiting examples of unsaturated esters are vinyl esters, acrylic acid and methacrylic acid esters, typically produced by conventional high pressure processes. The ester can have 4 to about 20 carbon atoms, preferably 4 to 10 atoms. Non-limiting examples of examples of vinyl esters are: vinyl acetate, vinyl butyrate, and vinyl pivalate. Non-limiting examples of acrylic and methacrylic acid esters are: methyl acrylate, ethyl acrylate, t-butyl acrylate, n-butyl acrylate, isopropyl acrylate, hexyl acrylate, decyl acrylate and lauryl acrylate. An exemplary polyolefin which may be used in the present invention is Escorene™ 783 commercially available from ExxonMobile.

In another aspect of this invention the polyolefin is elastomeric ethylene/α-olefin copolymers having an α-olefin content of from 15 wt %, preferably 25 wt % or more, based on the weight of the copolymer, These copolymers typically have an α-olefin content of 50 wt % or less, preferably 40 wt % or less and most preferably 35 wt % or less, based on the weight of the copolymer. The α-olefin content is measured by $^{13}C$ nuclear magnetic resonance (NMR) spectroscopy as described by Randall (Re. Macromolecular Chem. Phys. C29 (2&3)). The α-olefin is preferably a $C_{3-20}$ linear, branched or cyclic α-olefin. The term "copolymer" refers to a polymer made from at least two monomers. It includes, for example, copolymers, terpolymers and tetrapolymers, Examples of $C_{3-20}$ α-olefins include propene, 1-butene, 4-methyl-1-pentene, 1-hexene, 1-octene, 1-decene. 1-dodecene, 1-tetradecene, 1-hexadecene and 1-octadecene. The α-olefins also can contain a cyclic structure cyclohexane or cyclopentane, resulting in an α-olefin such as 3-cyclohexyl-1-propene and vinyl cyclohexane. Although not α-olefins in the classical sense of the term, for the purpose of this invention certain cyclic olefins such as norbornene and related olefins, particular 5-ethylidene-2-norborene, are encompassed by the term "α-olefins" and can be used as described above. Similarly, styrene and its related olefins, e.g. α-methylstyrene, etc are α-olefins for the purpose of this invention, Illustrative examples of copolymers include ethylene/propylene, ethylene/butane, ethylene/1-hexene, ethylene/1-octene, ethylene/styrene and similar. Illustrative examples of terpolymers include ethylene/propylene/1-octene, ethylene/butane/1-octene, ethylene/propylene/diene monomer (EPDM) and ethylene/butane/styrene, The copolymer can be random or blocky.

In another aspect of this invention the polyolefin may comprise an olefin polymer with hydrolysable silane groups and optionally a silanol condensation catalyst. The polymer composition according to this aspect is preferably an ethylene homopolymer or ethylene copolymer containing cross-linkable silane groups, which have been introduced by either copolymerization or graft polymerization. Non-limiting examples of preferred silane compounds are vinyltrimethoxy silane, vinylbismethoxyethoxy silane, vinyltriethoxy silane, gamma-(meth)acryloxypropyltrimethoxy silane, gamma-(meth)-acryloxy-propyltriethoxy silane and vinyltriacetoxy silane. Preferably, the silane-containing olefin copolymer or graft polymer is crosslinked under the action of water and a silanol condensation catalyst.

Copolymerisation can be carried out in the presence of one or more further comonomers which are copolymerisable with the two monomers and which, for example, may comprise one or more selected from vinylcarboxylate esters such as vinyl acetate and vinyl pivalate; (meth)acrylates such as methyl(meth)-acrylate, ethyl(meth)acrylate and butyl(meth)acrylate; (meth)acrylic acid derivatives such as (meth)acrylonitrile and (meth)acrylamide; vinyl ethers, such as vinylmethyl ether and vinylphenyl ether; alpha olefins such as propylene, 1-butene, 1-hexene, 1-octene and 4-methyl-1-pentene; olefinically unsaturated carboxyl acids, such as (meth)acrylic acid, maleic acid and fumaric acid; and aromatic vinyl compounds, such as styrene and alpha-methyl styrene.

Preferred comonomers are vinyl ethers of monocarboxylic acids having 1-4 carbon atoms, such as vinyl acetate and (meth)acrylate of alcohols having 1-8 carbon atoms, such as methyl(meth)acrylate. The expression"(meth)acrylic acid" used herein is intended to include both acrylic acid and methacrylic acid. The comonomer content in the polymer may amount to 40 wt % or less, preferably 0.5-35 wt %, more preferably 1-25 wt %.

According to the invention, the silane-containing polymer contains 0.001-15 wt % of the silane compound, preferably 0.01-5 wt % and especially preferred 0.1-3 wt %. In order to facilitate the incorporation of the solid conductive filler in the present invention it is preferred that the polymer comprises, apart from ethylene and the silane compound, at least one additional monomer chosen from the vinylcarboxylate esters, (meth)acrylates, (meth)acrylic acid derivatives and vinyl ethers mentioned above. This facilitates the mixing of the conductive filler. It is especially preferred that the olefin polymer comprises a terpolymer of ethylene, silane monomer and a third comonomer, which may be selected from one or more of $C_3$-$C_8$ alpha-olefins; vinyl esters of monocarboxylic acids having 1-4 carbon atoms, preferably vinyl acetate; and (meth)acrylates of alcohols having 1-8 carbon atoms, such as methyl(meth)acrylate, ethyl(meth)acrylate, propyl(meth)acrylate, and butyl(meth)acrylate. Copolymers of ethylene, silane monomer and methyl-, ethyl- or butyl acrylate are especially preferred.

The copolymerization of ethylene, the unsaturated silane compound and, optionally, additional comonomers may be carried out under any suitable conditions resulting in the formation of the desirable polymer. The crosslinking of the silane polymer is carried out with the aid of a catalysts, preferably a silanol condensation catalyst. In general any silanol condensation catalyst may be used in the present invention and a silanol condensation catalyst may be selected from the group consisting of carboxylates of metals, such as tin, zinc, iron, lead and cobalt; organic bases, as well as inorganics acids and organics acids. Special examples of silanol condensation catalysts are dibutyltin dilaurate, dibutyltin diacetate, dioctyltin dilaurate, stannous acetate, stannous caprylate, lead naphthenate, zinc caprylate, cobalt naphthenate, ethyl amines, dibutyl amine, hexyl amines, pyridine, inorganic acids, such as sulphuric acid and hydrochloric acid and organics acids, such as toluenesulphonic acid, acetic acid, stearic acid and maleic acid, Tin carboxylates are especially preferred catalyst compounds.

The amount of silanol condensation catalyst employed is generally in the order of 0.001-2 wt %, preferably 0.01-0.5 wt %, of the amount of silane-containing polymer in the composition.

Other examples of olefin polymers are: polypropylene, propylene copolymer; polybutene, butene copolymers; highly short chain branched α-olefins copolymers with an ethylene co-monomer content of 50 mole percent or less; polyisoprene; EPR (ethylene copolymerized with propylene); EPDM (ethylene copolymerized with propylene and a diene such as hexadiene, dicyclopentadiene, or ethylidene norbornene); copolymers of ethylene and an α-olefin having 3 to 20 carbon atoms such as ethylene/octene copolymers; terpolymers of ethylene, α-olefin and a diene; terpolymers of ethylene, α-olefin, and an unsaturated ester; copolymers of ethylene and vinyl-tri-alkyloxy silane; terpolymers of ethylene, vinyl-tri-alkoloxy silane and an unsaturated ester; or copolymers of ethylene and one or more acrylonitrile and maleic acid esters. In a further embodiment of the present invention, the olefin polymer may comprise ethylene ethyl acrylate. The comonomers can be incorporated randomly or in block and/or graft structures.

In another embodiment of the present invention the olefin polymer may comprise or may be a heterophasic olefin copolymer, e.g. a heterophasic propylene copolymer. The heterophasic propylene copolymer may be preferably a heterophasic copolymer comprising a propylene random copolymer as matrix phase (RAHECO) or a heterophasic copolymer having a propylene homopolymer as matrix phase (HECO). A random copolymer is a copolymer where the comonomer part is randomly distributed in the polymer chains and it also consists of alternating sequences of two monomeric units of random length (including single molecules). It is preferred that the random propylene copolymer comprises at least one comonomer selected from the group consisting of ethylene and $C_4$-$C_8$ alpha-olefins. Preferred $C_4$-$C_8$ alpha-olefins are 1-butene, 1-pentene, 4-methyl-1-pentene, 1-hexene, 1-heptene or 1-octene, more preferred 1-butene. A particularly preferred random propylene copolymer may comprise or consist of propylene and ethylene. Furthermore, the comonomer content of the polypropylene matrix preferably is 0.5 to 10 wt %, more preferably 1 to 8 wt % and even more preferably 2 to 7 wt %. For combining optimum processability with the required mechanical properties, the incorporation of the comonomer can be controlled in such a way that one component of the polypropylene contains more comonomer than the other. Suitable polypropylenes are described e.g. in WO 03/002652.

According to a further embodiment of the present invention the ratio between the $MFR_2$ of the semiconductive polyolefin composition to the $MFR_2$ of the olefin polymer base resin is preferably as high as possible. The increase in melt flow rate caused by adding the solid conductive filler or the GNP is as low as possible. A high ratio of $MFR_2$ of the semiconductive polyolefin composition to the $MFR_2$ of the olefin polymer base resin is beneficial for processing properties, e.g scorch performance, and mechanical properties. The typical $MFR_2$ of the olefin polymers is in the range of from 0.1 to 100 g/10 min as measured at 190° C. for polyethylene, at 230° C. for polypropylene and a load of 2.16 kg according to ISO 1133.

Preferably, the semiconductive polyolefin composition according to the present invention has a ratio of $MFR_2$ of the polyolefin composition to the $MFR_2$ of the olefin polymer base resin of 0.30 or more, wherein the $MFR_2$ is measured at a load of 2.16 kg in accordance to ISO 1133, at a temperature of 190° C. for polyethylene and at a temperature of 230° C. for polypropylene.

In one embodiment the semiconductive polyolefin compositions are crosslinkable. “Crosslinkable” means that the cable layer can be crosslinked before the use in the end application thereof. In crosslinking reaction of a polymer, interpolymer crosslinks (bridges) are primarily formed. Crosslinking can be initiated by free radical reaction using irradiation or preferably using a crosslinking agent, which is typically a free radical generating agent, or by the incorporation of crosslinkable groups into polymer component(s), as known in the art. Moreover, in cable applications the crosslinking step of the semiconductive composition is typically carried out after the formation of the cable.

The free radical generating crosslinking agent can be a radical forming crosslinking agent which contains at least one —O—O— bond or at least one —N═N— bond. More preferably, the crosslinking agent is a peroxide, whereby the crosslinking is preferably initiated using a well known peroxide crosslinking technology that is based on free radical crosslinking and is well described in the field. The peroxide can be any suitable peroxide, e.g. such conventionally used in the field.

As mentioned above crosslinking may also be achieved by incorporation of crosslinkable groups, preferably hydrolysable silane groups, into the polymer component(s) of the semiconductive composition. The hydrolysable silane groups may be introduced into the polymer by copolymerisation of e.g. ethylene monomers with silane group containing comonomers or by grafting with silane groups containing compounds, i.e. by chemical modification of the polymer by addition of silane groups mostly in a free radical grafting process. Such silane groups containing comonomers and compounds are well known in the field and e.g. commercially available. The hydrolysable silane groups are typically then crosslinked by hydrolysis and subsequent condensation in the presence of a silanol-condensation catalyst and water trace in a manner known in the art. Also silane crosslinking technique is well known in the art.

Preferably, the crosslinkable semiconductive composition layer comprises crosslinking agent(s), preferably free radical generating agent(s), more preferably peroxide. Accordingly, the crosslinking of at least the insulation layer, and optionally, and preferably, of the at least one semiconductive layer, is preferably carried out by free radical reaction using one or more free radical generating agents, preferably peroxide(s).

When peroxide is used as a cross-linking agent, then the cross-linking agent is preferably used in an amount of less than 10 wt %, more preferably in an amount of between 0.1 to 8 wt %, still more preferably in an amount of 0.2 to 3 wt % and even more preferably in an amount of 0.3 to 2.5 wt % with respect to the total weight of the composition to be cross-linked.

Non-limiting examples of peroxidic crosslinking agents are organic peroxides, such as di-tert-amylperoxide, 2,5-di (tert-butylperoxy)-2,5-dimethyl-3-hexyne, 2,5-di(tert-butylperoxy)-2,5-dimethylhexane, tert-butylcumylperoxide, di(tert-butyl)peroxide, dicumylperoxide, butyl-4,4-bis(tert-butylperoxy)-valerate, 1,1-bis(tert-butylperoxy)-3,3,5-trimethylcyclohexane, tert-butylperoxybenzoate, dibenzoylperoxide, bis(tert butylperoxyisopropyl)benzene, 2,5-dimethyl-2,5-di(benzoylperoxy)hexane, 1,1-di(tert-butylperoxy) cyclohexane, 1,1-di(tert amylperoxy)cyclohexane, or any mixtures thereof. Preferably, the peroxide is selected from 2,5-di(tert-butylperoxy)-2,5-dimethylhexane, di(tert-butylperoxyisopropyl)benzene, dicumylperoxide, tert-butylcumylperoxide, di(tert-butyl)peroxide, or mixtures thereof.

In another embodiment of the present invention the semiconductive polyolefin composition can also contain further additive(s), such as antioxidant(s), stabiliser(s), water tree retardant additive(s), processing aid(s), scorch retarder(s), filler(s), metal deactivator(s), crosslinking booster(s), flame retardant additive(s), acid or ion scavenger(s), additional inorganic filler(s), voltage stabilizer(s) or any mixtures thereof. Additives are typical use in concentrations from 0.01 wt % to 10 wt %.

As non-limiting examples of antioxidants e.g. sterically hindered or semi-hindered phenols, aromatic amines, aliphatic sterically hindered amines, organic phosphites or phosphonites, thio compounds, and mixtures thereof, can be mentioned.

Preferably, the antioxidant is selected from the group of diphenyl amines and diphenyl sulfides. The phenyl substituents of these compounds may be substituted with further groups such as alkyl, alkylaryl, arylalkyl or hydroxy groups.

Preferably, the phenyl groups of diphenyl amines and diphenyl sulfides are substituted with tert.-butyl groups, preferably in meta or para position, which may bear further substituents such as phenyl groups.

More preferred, the antioxidant is selected from the group of 4,4'-bis(1,1-dimethylbenzyl)diphenylamine, para-oriented styrenated diphenyl-amines, 6,6'-di-tert.-butyl-2,2'-thiodi-p-cresol, tris(2-tert.-butyl-4-thio-(2'-methyl-4'hydroxy-5'-tert.-butyl)phenyl-5-methyl)phenylphosphite, polymerized 2,2,4-trimethyl-1,2-dihydroquinoline, or derivatives thereof. Of course, not only one of the above-described antioxidants may be used but also any mixture thereof.

The amount of an antioxidant is preferably from 0.005 to 2.5 wt %, based on the weight of the semiconductive composition. The antioxidant(s) are preferably added in an amount of 0.005 to 2 wt %, more preferably 0.01 to 1.5 wt %, even more preferably 0.04 to 1.2 wt %, based on the weight of the semiconductive composition. In a further preferable embodiment, the semiconductive composition may comprise free radical generating agent(s), one or more antioxidant(s) and one or more scorch retarder(s).

The scorch retarder (SR) is a well known additive type in the field and can i.e. prevent premature crosslinking. As also known the SR may also contribute to the unsaturation level of the polymer composition. As examples of scorch retarders allyl compounds, such as dimers of aromatic alpha-methyl alkenyl monomers, preferably 2,4-di-phenyl-4-methyl-1-pentene, substituted or unsubstituted diphenylethylenes, quinone derivatives, hydroquinone derivatives, monofunctional vinyl containing esters and ethers, monocyclic hydrocarbons having at least two or more double bonds, or mixtures thereof, can be mentioned. Preferably, the amount of a scorch retarder is within the range of 0.005 to 2.0 wt. %, more preferably within the range of 0.005 to 1.5 wt. %, based on the weight of the semiconductive composition. Further preferred ranges are e.g. from 0.01 to 0.8 wt %, 0.03 to 0.75 wt %, 0.03 to 0.70 wt %, or 0.04 to 0.60 wt %, based on the weight of the semiconductive composition. One preferred SR added to the semiconductive composition is 2,4-diphenyl-4-methyl-1-pentene.

Examples of processing aids include but are not limited to metal salts of carboxylic acids such as zinc stearate or calcium stearate; fatty acids; fatty amids; polyethylene wax; copolymers of ethylene oxide and propylene oxide; petroleum waxes; non ionic surfactants and polysiloxanes.

Non-limiting examples of additional fillers are clays precipitated silica and silicates; fumed silica calcium carbonate.

It is intended throughout the present description that the expression "compounding" embraces mixing of the material according to standard methods to those skilled in the art. Non-limiting examples of compounding equipments are continuous single or twin screw mixers such as Farell™, Werner and Pfleiderer™, Kobelco Bollling™ and Buss™, or internal batch mixers, such as Brabender™ or Banbury™.

Any suitable process known in the art may be used for the preparation of the semiconductive polyolefin compositions of the present invention such as dry-mixing, solution mixing, solution shear mixing, melt mixing, extrusion, etc.

The present invention is also directed to a process for producing the preferred inventive semiconductive polyolefin composition, comprising pre-mixing the graphene nanoplatelets and the solid conductive filler.

Pre-mixing as used herein shall indicate that the mixing occurs before the resulting mixture is contacted and mixed with the olefin polymer base resin.

As mentioned above, the semiconductive polyolefin composition of the present invention is highly useful in a wide variety of wire and cable applications. Especially it may be incorporated into an electric power cable, particularly in a semiconductive layer of the cable. A power cable is defined to be a cable transferring energy operating at any voltage, typically operating at voltages higher than 1 kV. The voltage applied to the power cable can be alternating (AC), direct (DC), or transient (impulse). Electric power cables, especially medium voltage, high voltage and extra high voltage cables, typically comprise two semiconductive layers and one insulation layer. The term "semiconductive" refers to electrical conductivity intermediate between that of insulating materials and conducting materials. A typical range of electrical conductivity for semiconductors is in the range from $10^{-9}$ to $10^{+3}$ S/cm (see for example McGraw-Hill Dictionary of scientific and technical terms), corresponding to electrical resistivity between $10^{9}$ to $10^{-3}$ ohm cm. Hence the term "semiconductive" excludes insulation materials. Likewise the present semiconductive polyolefin composition and the ingredients therefor exclude any applications for insulating compositions or insulating layers in a power cable.

The cable comprises preferably one or more conductors surrounded by at least a semiconductive layer and an insulation layer, in that order. More preferably, the cable comprises a conductor surrounded by an inner semiconductive layer, an insulation layer and optionally, and preferably, an outer semiconductive layer, in that order, as defined above. More preferably, at least the inner semiconductive layer comprises the semiconductive composition. Preferably also the outer semiconductive layer comprises the semiconductive composition.

In a preferred embodiment at least the inner semiconductive layer of the cable is crosslinkable. The outer semiconductive layer of the cable may be crosslinkable or non-crosslinkable, depending on the end application. Moreover, the outer semiconductive layer of the cable, if present, may be bonded or strippable, which terms have a well known meaning in the field. The semiconductive composition of the cable may comprise further component(s), such as further polymer component(s) and/or one or more additive(s).

It is evident to a skilled person that the cable can optionally comprise one or more other layer(s) comprising one or more screen(s), a jacketing layer or other protective layer(s), which layer(s) are conventionally used in of field of wire and cable.

The preferred cable is preferably an alternating current (AC) or direct current (DC) power cable, more preferably a medium voltage (MV), a high voltage (HV) or an extra high voltage (EHV) power cable. It is evident that the following further preferable embodiments, subgroups and further properties of the polymer compositions, and components thereof, and of the layers of the cable are generalisable and independent definitions which can be used in any combination for further defining the cable.

The polyolefin composition of the present invention is highly suitable for power cables, especially for power cables operating at voltages higher than 6 kV to 36 kV (medium voltage (MV) cables) and at voltages higher than 36 kV, known as high voltage (HV) cables and extra high voltage (EHV) cables, which EHV cables operate, as well known, at very high voltages. The terms have well known meanings and indicate the operating level of such cables. Combined with good electrical conductivity, the semiconductive composition has also superior surface smoothness and high processability.

The invention also provides a process for producing a cable, preferably a crosslinkable power cable, as defined above or in claims, comprising steps of applying on a conductor, preferably by (co)extrusion, at least a semiconductive layer comprising the semiconductive polyolefin composition of the present invention. Further layers may be applied in the same or additional coextrusion step(s).

Examples

1. Measurement Methods (a) Melt Flow Rate

The $MFR_2$ was measured with 2.16 kg load at 190° C. for polyethylene and at 230° C. for polypropylene according to ISO 1133.

(b) Volume Resistivity

For the measurement of volume resistivity 2 mm thick plaques were pressed at 150° C. for two minutes. The plaques were cooled down to room temperature. The plaques were placed in between two metallic electrodes and the plaques heated to 120° C. for 30 min to anneal the sample and ensure a good contact between the compound and the electrodes. The compounds were slowly cooled down to room temperature, roughly 22° C. The resistance R in ohm is measured using an ohm-meter. The area A is calculated as $A=\pi\ (d/2)^2$ where d is the diameter of the circular electrodes in cm. L is the thickness in cm of the plagues after annealing. All the distances are measured by callipers or micrometer screw. The volume resistance VR is calculated as VR. R×A/L.

(c) Temperature Dependence of Volume Resistivity

The volume resistivity was measured on plaques with a thickness between 1 to 3 mm and a diameter of 20 to 50 mm. The plaques were produced by applying pressure to the sample at temperatures in the range of 150 to 180° C. The volume resistance was measured with a broadband dielectric spectrometer (Novocontrol, Alpha) at a frequency of 50 Hz using stainless steel electrodes. The heating and cooling rate was 5K/min (GNP composition) or 10K/min (CB compositions). Before the thermal cycle the materials were annealed at or above 120° C. for 10 minutes to remove the influence of thermal history. In the heating scan additional annealing stages have been performed for 10 or 5 min for the sample of Example 3 and the sample of Comparative Example 4. Annealing is done by heating a sample and keeping it at that increased temperature for a prolonged period of time. The temperature is chosen so that it is above the melting temperature of the resin. The time is selected to remove any thermal history. The treatment removes internal stress and all parameters which were affected due to manufacturing.

The volume resistance VR is obtained directly from the instrument and calculated as VR=R×A/L, where L is the thickness of the plaques and the area A is calculated as $A=\pi\ (d/2)^2$, where d is the diameter of the circular electrodes. All the distances used in the calculations are measured by calipers or micrometer screw.

(d) Surface Roughness

The surface roughness of the material was determined by investigations with optical microscopy of the surface of strings extruded under conditions applied in MFR (ISO 1133, with 2.16 kg load at 190° C.) experiments. The surface of the strings was recorded with an optical camera focused on the profile of the string. The typical profile length investigated was 2.5 mm and the optical enlargement 50 times. The distances were calibrated with special objective glass with millimeters marks. The recorded profiles was analysed and position of the edge extracted. This can for example be performed with edge detection routines e.g. available in MatLab™. The long range bend or curvature of the strings was corrected for by a least-square curve fit with a polynomial of the order 2. The surface roughness was then calculated as the R_RMS calculated as Equation 1

$$R\_RMS = \left(\frac{1}{n}\sum_{i=1}^{n}(\Delta y_i)^2\right)^{1/2}. \quad \text{Equation 1}$$

Here $\Delta y_i$ is the deviation in micrometers between the recorded edge and the polynomial, i is the index of different pixels along the profile. For each material at least 8 different photos were recorded and analysed. The standard deviation of the obtained surface roughness index, R_RMS, was calculated.

2. Materials

Graphene Nanoplatelets. GNP xGNP™, commercially available from XG Science. The density of the xGNP is around 2.0 $g/cm^3$ and the platelet thickness is in the range from 8 to 13 nanometers. The average lateral size (diameter) is around 5 micrometer. The BET data showed the surface area of the xGnP reached more than 100 $m^2/g$.

Carbon Black

Elftex™ 254, commercially available from Cabot Corporation, Leuwen, Belgium with the following properties:

| | |
|---|---|
| Iodine number measured by ASTM D1510 | <180 m/g |
| Particle size measured by ASTM D3849, procedure D | <25 nm |
| Ash content measured by ASTM D1506 | <0.1% |
| Toluene extract measured by ASTM D4527 | <0.03% |

Expanded Graphite

TIMREX® BNB90™, commercially available from Timcal Graphite and Carbon. This material has a particle size distribution with a D90 less than 100 µm. The surface areas are characterized with BET=28 $m^2/g$ and Oil adsorption number of 150 ml/100 g.

EVA

Escorene™ 783, commercially available from ExxonMobile

The vinyl acetate-content of the material was 33% and the $MFR_2$=43 g/10 min at 190° C. and 2.16 kg.

The materials were produced by mixing the polymer with the conductive filler using a Brabender mixer. For all compounds the conductive filler constitutes 10 percent based on weight shown in the table below. The base resin for the materials in Table 1 is an ethylene vinyl-acetate (ESCORENE™ 783) with a vinyl-acetate content of 33 wt % and $MFR_2$ of 43 g/10 min (EVA1). For Comparative Example 4, an ethylene vinyl-acetate (ESCORENE™ 783)

with a vinyl-acetate content of 20 wt % and $MFR_2$ of 20 g/10 min (EVA2) and for Comparative Example 5, an ethylene vinyl-acetate (ESCORENE™ 783) with a vinyl-acetate content of 9 wt % and $MFR_2$ of 9 g/10 min (EVA3) was used. The GNP used was obtained from XG Science (xGNP™) with a typical thickness in the range from 8 to 13 nanometers and a diameter around 5 micrometers. The expanded graphite was TIMREX BNB90™. The carbon black was Elftex 254 from CABOT.

The compounds were produced in general accordance with the description of Kalaitzidou et al. Composites Science and Technology 67 (2007) 2045. The following processing scheme was adopted.

The base resin was cooled with liquid nitrogen and ground to a powder. The proper amount of the GNP or carbon black was dispersed in isopropanol in a glass bottle, with roughly 10 times more isopropanol by weight. For composition with a combination of carbon black and GNP the carbon black was dispersed in the isopropanol solution after the GNP. The isopropanol solution with the GNP and/or carbon black was placed in an ultrasound bath for 30 minutes at room temperature. The base resin was dispersed in the isopropanol solution with the GNP and/or carbon black to make a slurry. The slurry was placed in an ultrasound bath for another 30 minutes. Excessive isopropanol was evaporated by storage at room temperature for some days. The slurry was compounded into Brabender batch mixer preheated to 190° C. and mixed at 50 revolutions per minute (RPM) for 10 min.

TABLE 1

| | | Example #1 | Example #2 | Comp. Example #1 | Comp. Example #2 | Comp. Example #3 |
|---|---|---|---|---|---|---|
| EVA1 | wt % | 90 | 90 | 90 | 90 | 100 |
| xGNP | wt % | 10 | 8 | | | |
| Expanded graphite | wt % | | | 10 | | |
| Carbon black | wt % | | 2 | | 10 | |
| $MFR_2$ (190° C./2.16 kg) | g/10 min | 15.12 | 21.68 | 12.05 | 34.83 | 43 |
| VR | ohm cm | $9.5 \times 10^6$ | $2.5 \times 10^4$ | $1.7 \times 10^5$ | $8.3 \times 10^9$ | $>1 \times 10^{13}$ |
| R_RMS | μm | 79.7 ± 6.2 | 57.1 ± 13.4 | 123.6 ± 14.7 | 66.5 ± 22.8 | NA |
| $MFR_2$(composition)/ $MFR_2$(base resin) | | 0.35 | 0.50 | 0.28 | 0.81 | 1.00 |

The measurements show that with expanded graphite the surface is very rough, R_RMS above 100 micrometer, and unsuitable for cable applications. Example 1 containing 10 wt % of GNP has excellent surface smoothness, while the viscosity and volume resistivity is in a suitable range for semiconductive applications. In contrast, Comparative Example 2 shows that with 10 wt % carbon black the resistivity is too high, i.e. the material is not semiconductive. For all other compositions the volume resistivity is in the semiconductive range. The lowest volume resistivity is observed for the mixture of GNP and carbon black. The measurements also show that the lowest MFR values are obtained with expanded graphite, thus leading to unacceptable flowability and also the surface smoothness was unacceptable for cable applications With GNP or carbon black the ability to flow is sufficiently high. The $MFR_2$ of the pure EVA is 43 g/10 min. To summarize the measurements show that the GNP-based semiconductive compositions gives superior surface smoothness and higher MFR (lower viscosity) as well as low volume resistivity. Especially beneficial is the combination of GNP and carbon black.

In another series of experiments the temperature dependence of the volume resistivity and the self-healing effect upon annealing were examined. The compositions according to the following Table 2 were prepared and tested. The compositions according to Example 3, Comparative Example 4 and Comparative Example 5 were prepared in accordance with the procedures described for the compositions shown in Table 1 above.

TABLE 2

| | | Ex. 3 | Comp Ex. 4 | Comp Ex. 5 |
|---|---|---|---|---|
| EVA1 | ESCORENE 783 ($MFR_2$ = 43, 33% VA) | 90 | | |
| EVA2 | $MFR_2$ = 20, VA = 20% | | 84.2 | |
| EVA3 | $MFR_2$ = 9, VA = 9% | | | 63.2 |
| GNP | xGNP (XG Science) | 10 | | |
| CB | Conductex 7051 | | 15 | 36 |
| AO | TMQ | | 0.8 | 0.8 |
| $VR_{peak}/VR_{RT}$ (heating) | | 14 | 43.300 | 230 |
| $VR_{peak}/VR_{50° C.}$ (cooling) | | 1.2 | 75 | 20 |

Figure 5:
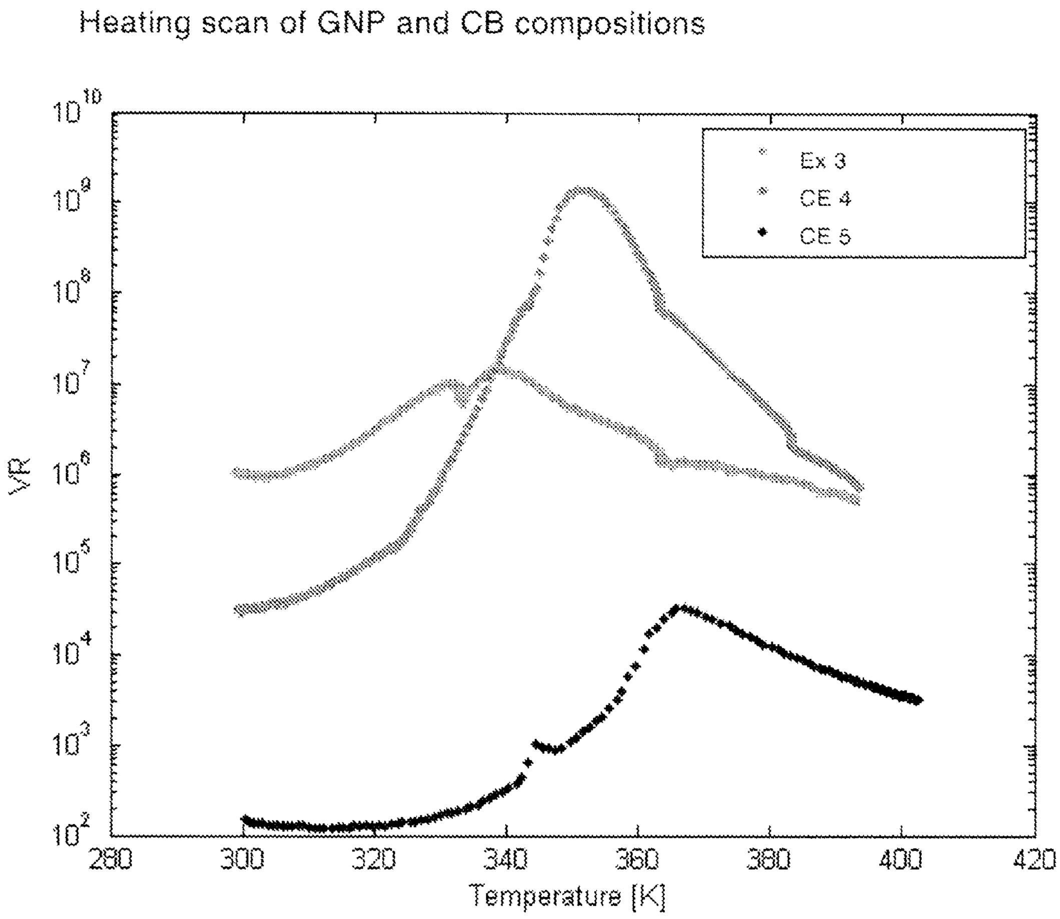
FIG. 5 shows a heating scan in the determination of the temperature dependence of the volume resistivity of Example 3, Comparative Example 4 and Comparative Example 5.
Figure 6:
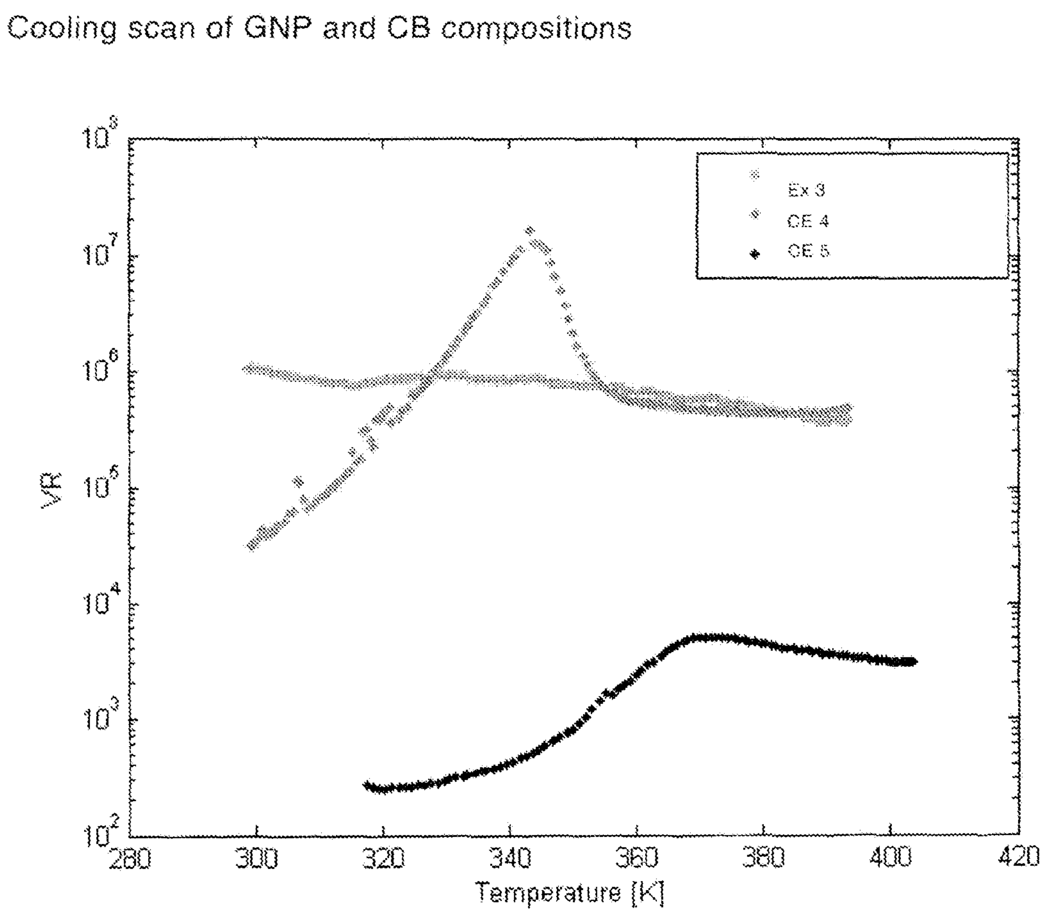
FIG. 6 shows a cooling scan in the determination of the temperature dependence of the volume resistivity of Example 3, Comparative Example 4 and Comparative Example 5.

FIG. 5 and FIG. 6 show the volume resistivity as a function of temperature for the three compositions upon heating and cooling, respectively. FIG. 5 shows that the temperature dependence of VR for the inventive Example 3 comprising GNP is much less pronounced than for the comparative examples comprising carbon black. In the Comparative Examples 4 and 5 two different CB contents (36 wt % and 15 wt %) were used. It can be seen that the ratio of the maximum VR over VR at room temperature (23° C.) is roughly 230 and 43300 at 36 wt % and 15 wt % CB loadings, respectively, while the corresponding value for the GNP-composite is 14. This shows that VR of the GNP-composition has much less pronounced temperature dependence than the CB compositions. This is a distinct advantage for semiconductive polymer compositions in power cable applications since the semiconductive composition and layer will have smaller temperature variation when operated at different power loadings, which in turn result in the development of varying rise of temperature. The lower temperature dependence infers that a higher VR can be accepted at room temperature and the overall filler loading can thus be reduced.

The difference between GNP and CB compositions is even more pronounced when the cooling cycle is considered, as displayed in FIG. 6. The GNP composition (Example 3) reveals an almost perfect flat line whereas the CB compositions (Comparative Examples 4 and 5) have a similar performance as upon heating with a pronounced peak, although the peak position is slightly shifted to lower temperatures. The observed values for $VR_{peak}/VR_{50° C.}$ upon cooling are 1.2 for Example 3, 75 for Comparative Example 4 and 20 for Comparative Example 5, respectively.

The absence of a peak for the GNP composition hence infers that the percolation pathways in this system is not perturbed by the crystallisation of the polymer, or in other words, the polymer crystallises in domains around the GNP.

Figure 7:
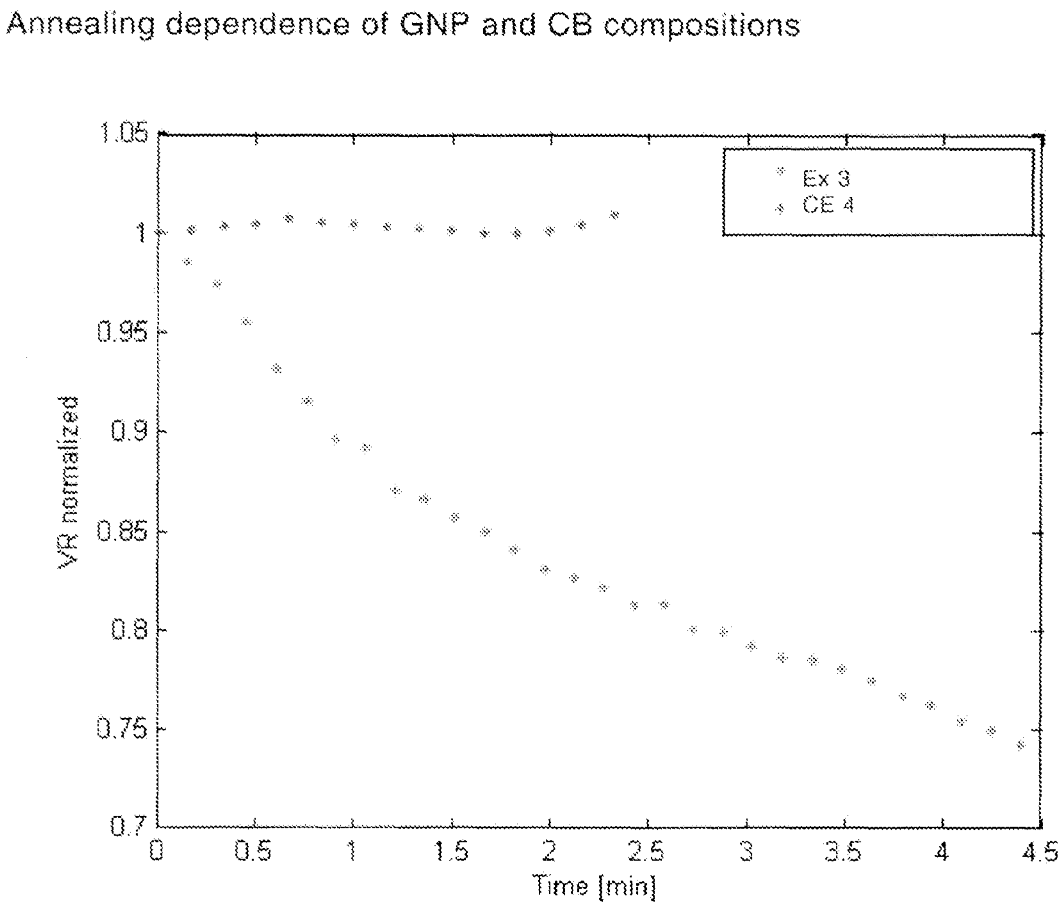
FIG. 7 shows the annealing dependence of volume resistivity of Example 3 and Comparative Example 4.

An additional new finding with the inventive semiconductive polymer compositions is the reduction of VR upon annealing at temperatures below the melting temperatures. For the compositions according to the Comparative Examples 4 and 5, the VR remains almost unchanged when the temperature is kept constant as is shown in FIG. 7. This is in contrast to the inventive Example 3 where a reduction of VR of more than 25% is observed when annealed for 5 min. Further extending the annealing appears to even further reduce VR. This is a key beneficial feature for semiconductive compositions for power cables since one of the restricting factors is that thermal cycling and prolonged annealing have resulted in deterioration of VR-performance for semiconductive polymer compositions including carbon black so that the GNP compositions of the invention achieve substantial advance in long-term VR performance, if the compositions are used in semiconductive layers for power cables.

Thus the semiconductive polyolefin composition of the present invention does not only provide substantial decrease in surface roughness and volume resistivity, but also provides substantial increase in processability and flowability which is highly desirable for the manufacture of semiconductive layers in power cables. Moreover by the inventive combination of graphene nanoplatelets and carbon black in a semiconductive composition not only could the above effects be achieved but the process costs could be sharply decreased. The partial replacement of graphene nanoplatelets which are rather costly by carbon black leads to cost savings while the partial replacement of carbon black by graphene nanoplatelets gives synergistic effects regarding surface roughness decrease, conductivity increase and simultaneous flowability of the inventive composition. Furthermore, the temperature dependence of the volume resistivity could be reduced and a self-healing effect could be observed in long-term VR performance over conventional carbon black filled semiconductive compositions.

The invention claimed is:

1. A power cable, comprising a semiconductive polyolefin composition comprising (a) an olefin polymer base resin, and (b) graphene nanoplatelets, wherein the graphene nanoplatelets (b) have an average thickness in the range of from 1 nm to 50 nm and a lateral diameter of 200 μm or less, both measured with atomic force microscopy (AFM), and a surface roughness characterized by R_RMS, measured on extruded samples, is 100 micrometer or less.

2. The power cable according to claim 1, wherein the graphene nanoplatelets (b) are contained in the range of from 4 to 15 wt %, based on the total weight of the polyolefin composition.

3. The power cable according to claim 1, wherein the graphene nanoplatelets (b) are contained in the range of from 6 to 12 wt %, based on the total weight of the polyolefin composition.

4. The power cable according to claim 1, further comprising (c) a solid conductive filler different from (b).

5. The power cable according to claim 4, wherein the solid conductive filler (c) is carbon black.

6. The power cable according to claim 5, wherein said carbon black fulfills at least one of the following requirements:

(a) an iodine number of at least 30 mg/g, measured in accordance with ASTM D 1510, (b) a DBP oil adsorption number of at least 30 ml/100 g, measured in accordance with ASTM D 2414, (c) a BET nitrogen surface area of at least 30 $m^2/g$, measured in accordance with ASTM D 3037, (d) a statistical surface area (STSA) of at least 30 $m^2/g$ measured in accordance with ASTM D5816.

7. The power cable according to claim 5, wherein said carbon black fulfills a combination of the following requirements:

(a) an iodine number of at least 30 mg/g, measured in accordance with ASTM D 1510, (b) a DBP oil adsorption number of at least 30 ml/100 g, measured in accordance with ASTM D 2414, (c) a BET nitrogen surface area of at least 30 $m^2/g$, measured in accordance with ASTM D 3037, (d) a statistical surface area (STSA) of at least 30 $m^2/g$ measured in accordance with ASTM D5816.

8. The power cable according to claim 5, wherein said carbon black fulfills all of the following requirements:

(a) an iodine number of at least 30 mg/g, measured in accordance with ASTM D 1510, (b) a DBP oil adsorption number of at least 30 ml/100 g, measured in accordance with ASTM D 2414, (c) a BET nitrogen surface area of at least 30 $m^2/g$, measured in accordance with ASTM D 3037, (d) a statistical surface area (STSA) of at least 30 $m^2/g$ measured in accordance with ASTM D5816.

9. The power cable according to claim 4, wherein the solid conductive filler (c) is contained in the composition with a fraction of 5 to 95 wt %, in relation to the weight of the graphene nanoplatelets (b).

10. The power cable according to claim 1, wherein the average thickness of the graphene nanoplatelets (b) is in the range of from 1 nm to 40 nm.

11. The power cable according to claim 1, wherein the graphene nanoplatelets (b) have an aspect ratio of diameter to thickness that is 50 or more, measured by atomic force microscopy.

12. The power cable according to claim 1, wherein the graphene nanoplatelets (b) are contained in the range of from 2 to 20 wt %, based on the total weight of the polyolefin composition.

13. The power cable according to claim 1, wherein the olefin polymer base resin (a) comprises an ethylene homo- or copolymer or a propylene homo- or copolymer.

14. The power cable according to claim 1, wherein the olefin polymer base resin (a) comprises a copolymer of ethylene with at least one comonomer selected from unsaturated esters.

15. The power cable according to claim 14, wherein the unsaturated ester is selected from vinyl esters, acrylic acid or methacrylic acid esters.

16. The power cable according to claim 15, wherein the unsaturated ester is selected from methyl acrylate, ethyl acrylate or butyl acrylate.

17. The power cable according to claim 16, wherein an amount of acrylate comonomer units is from 1 to 15 mol % with regard to a total amount of monomers in the copolymer of the composition.

18. The power cable according to claim 1, having a ratio of $MFR_2$ of the polyolefin composition to the $MFR_2$ of the olefin polymer base resin of 0.30 or more, wherein the $MFR_2$ is measured at a load of 2.16 kg in accordance to ISO 1133, at a temperature of 190° C. for polyethylene and at a temperature of 230° C. for polypropylene.

* * * * *